United States Patent

[11] 3,557,679

| [72] | Inventors | Alexander Spoerl<br>8183 Rottach-Egern-D-, Germany,<br>Heinrich H. Heer, Höhestrasse 60,<br>Zollikon, Zurich, Switzerland |
|---|---|---|
| [21] | Appl. No. | 732,162 |
| [22] | Filed | May 27, 1968 |
| [45] | Patented | Jan. 26, 1971 |
| [32] | Priority | May 31, 1967, Apr. 9, 1968 |
| [33] | | Germany |
| [31] | | 61255/42 and 1773166 |

[54] STAND FOR PHOTOGRAPHIC OR CINEMATOGRAPHIC CAMERAS
5 Claims, 5 Drawing Figs.

[52] U.S. Cl. .................................................. 95/86
[51] Int. Cl. ........................................... G03b 17/56
[50] Field of Search .................................... 95/86

[56] References Cited
UNITED STATES PATENTS

| 2,673,502 | 3/1954 | Skodock........................ | 95/86 |
| 2,806,416 | 9/1957 | Jones............................ | 95/86 |

*Primary Examiner*—John M. Horan
*Attorney*—Werner W. Kleeman

ABSTRACT: A novel improvement in a stand for photographic and cinematographic cameras is disclosed, the novel mechanism of the subject invention comprising two supporting arms which are connectable to the upper end part of a stand, the free ends of the arms being adjustably spaced apart from one another and from the longitudinal axis of the stand and further being capable of being supported against the chest and shoulder of the photographer. By use of the novel mechanism of the subject invention, a three point bearing results which offers high stability in both the horizontal and vertical directions for the camera utilized.

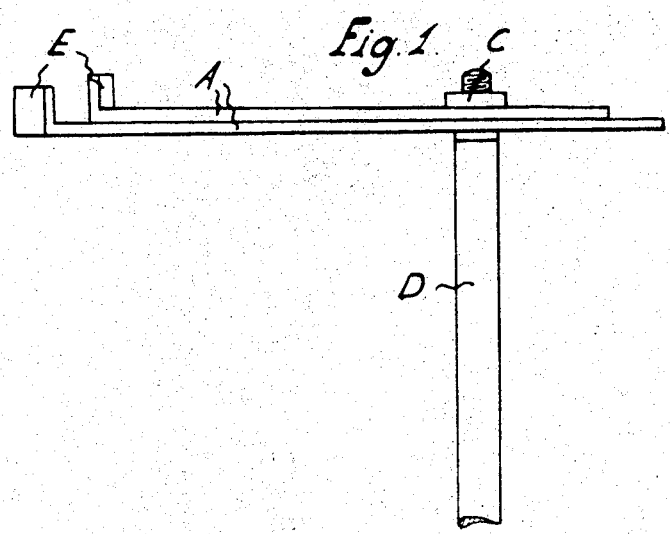
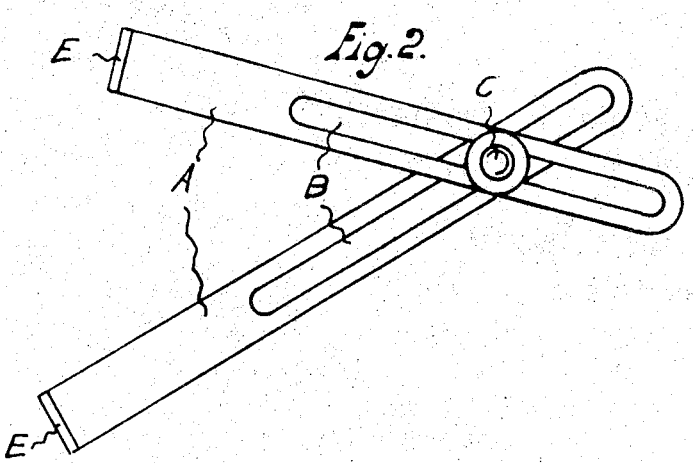

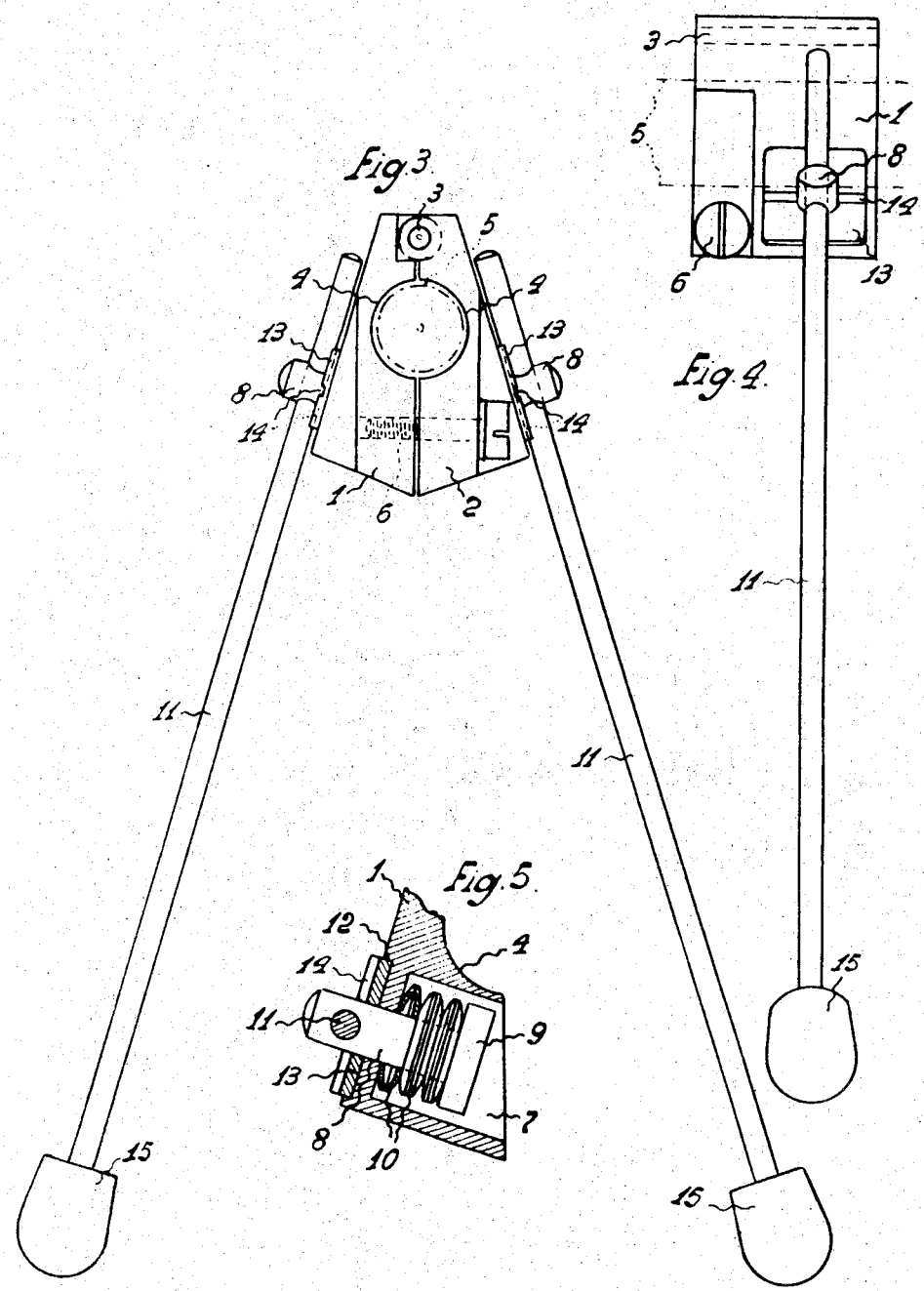

STAND FOR PHOTOGRAPHIC OR CINEMATOGRAPHIC CAMERAS

This invention relates to stands for photographic and cinemaphotographic cameras and particularly to improvements therein.

Photographic still cameras with lengthy exposure times which exceed one-sixtieth or one-thirtieth seconds and cinematographic cameras with comparatively long focal distance lenses require a secure camera support for technical perfection with.

The usual tripod supports only satisfy such requirements when they are extremely stable and correspondingly heavily built which makes their transportation and erection thereof troublesome and time consuming. The shoulder support with rucksack belts and supporting plate on the pit of the stomach and the supports appertaining thereto previously proposed as a substitute for these tripods has not proved satisfactory because of its unwieldiness. Even lighter shoulder supports with neck straps and a light support on the chest have not proved a success. The so-called single-legged stand also previously proposed is not satisfactory since it does prevent vertical moving and vibrating of the exposures and does not secure the camera against horizontal swinging.

Accordingly, a need exists for an improved camera stand and an object of the invention is to provide such a mechanism which obviates the disadvantages of a one-legged stand discussed above.

The novel mechanism constructed in accordance with the invention comprises two supporting arms which are connectable to the upper end part of a stand, the free ends of the arms being adjustably spaced apart from one another and from the longitudinal axis of the stand and being capable of being supported against the chest and shoulder of the photographer.

By the use of a stand provided with a mechanism constructed according to the invention, a three point bearing results which gives the camera good stability in both the horizontal and vertical directions.

The invention will be better understood and additional features and advantages thereof will become apparent when consideration is given the following detailed description, such description making reference to the appended drawings, wherein:

FIG. 1 shows a side view of a mechanism according to the first embodiment;

FIG. 2 shows a plan view of FIG. 1;

FIG. 3 shows a plan view of the mechanism according to a second embodiment;

FIG. 4 shows a side view of FIG. 3; and

FIG. 5 shows on a larger scale and in section a detail of the mechanism according to the second embodiment.

The novel depicted in FIGS. 1 and 2 comprises two flat rail-like arms A having slots B therein by means of which these arms are clamped together by a threaded head C of a stand screwed on the upper end of a leg D. When the threaded head C is released or loosened slightly, the arm A can be adjusted in their longitudinal direction and pivoted in relation to one another. By tightening the threaded head C, the arms A are clamped in their adjusted position. At one end of each arm A there is an end part E bent at an angle which may be disposed upwards or downwards selectively according to the mounting of the arms.

In operating the novel mechanism as described according to FIGS. 1 and 2, the two arms A disposed on the upper end of the leg stand D are so adjusted that the angled end parts E are spaced apart from one another and from the longitudinal axis of the leg D, as shown, for example, in FIG. 2. The photographic or cinemaphotographic camera is then screwed onto the threaded head C of the stand with the lens of the camera facing away from the end parts E of the arms A. When photographing or filming, the two end parts E of the arms A are supported against the chest or shoulder while, at the same time, the lower end of the leg stand D is supported on the ground and the object to be photographed is sighted through the viewer of the camera. In this way a three point bearing of the camera is obtained so that the latter is secured against undesired pivoting movements in the vertical and horizontal directions.

The arms A are adjusted according to the position of the viewfinder eyepiece and depend also on whether the person photographing or filming looks into the viewfinder with the right or left eye.

In a further the embodiment of the novel mechanism depicted in FIGS. 3 to 5, a holder with two jaws 1 and 2 is provided, the jaws being connected to one another by means of a hinge joint 3. Semicircular recesses 4 are formed in the two jaws 1, 2. When the jaws are hinged against one another, the recesses together form a cylindrical opening the axis of which runs parallel to the axis of the hinge joint 3 and receives a stand tube 5. A screw 6 connects the two jaws 1 and 2 and permits the clamping of the mechanism at the upper end of the stand tube 5 which is a constituent part of a one-legged stand.

In bores 7 in the two jaws 1 and 2, two bolts 8 with enlarged heads 9 are rotatable and mounted to be movable in an axial direction. The bolts 8 are maintained under the action of springs which are formed by shell-like arched spring washers 10. Rodlike supporting arms 11 are longitudinally mounted in cross bores through the bolts 8, the arms being pressed laterally against the jaws 1 and 2 under the action of the springs 10. Square plates 13 are mounted in recesses 12 in the jaws 1 and 2, the square plates having two grooves 14 crossing one another at right angles.

The supporting arms 11 contact the outer face of the plates 13 and engage in the grooves 14 and the springs 10 press the arms into the grooves 14.

The free ends of the supporting arms 11 each carry a pad 15, for example, made of rubber or similar material.

The grooves 14 are so arranged that the supporting arms 11 engage the grooves in one of two positions at right angles to one another and are then secured. In one position the arms 11 run in a plane at right angles to the stand tube 5 and, in the other position, parallel therewith.

Due to the action of the spring 10 an adjustment of the arms 11 in intermediate positions, and looking therein in such intermediate positions may be made.

The axis of the bolts 8 in the two jaws 1 and 2 subtend an obtuse angle to one another and are at right angles to the lateral surface of these jaws.

Upon pivoting of the supporting arms 11 into a plane extending at right angles to the tube 5, the arms diverge towards their free ends (FIG. 3). In this position according to FIG. 3, the pads 15 on the arms 11 are applied against the chest or shoulders of the user whereby together with the foot of the leg 5 they ensure a three point bearing for the stand and thereby a motionless stability in the vertical and horizontal directions of the photographic or cinematographic camera which is firmly screwed onto the stand. By longitudinal displacement of the supporting arms 11 in the cross bores of the bolts 8 the free ends of the supporting arms provided with the pads 15 may be adjusted as required so that the user of the stand can look comfortably into the eyepiece of the viewfinder of the camera fixed on the leg stand 5 when the foot of the leg stand and the supporting arms 11 are supported as a three-point bearing in the aforedescribed manner.

When the stand is not in use for transport purposes, the supporting arms 11 are swung into a position parallel to the longitudinal axis of the leg so that the space requirements of the stand and the novel mechanism therefor is advantageously reduced. the supporting arms 11 may be readily brought into the position for use according to FIG. 3.

The foregoing are the main advantages of the second embodiment of the subject matter of the invention yet other advantages will be apparent to those skilled in the art.

The novel mechanism depicted into FIGS. 3 to 5 may, if desired, be fitted to one leg of a tripod, for example, by employing an intermediate member having a pin for insertion into the recesses 4 of the holder and, by means of a further clamping mechanism, it can be connected to one leg of the tripod.

The plates 13 may be omitted if desired and the grooves 14 formed directly in the jaws 1, 2 or the jaws may be provided with ribs for positioning the arms 11.

I claim:

1. A stand for a camera, said stand comprising a leg means defining a stand tube and two supporting arm means connectable to the upper end of said leg means, the free ends of said arm means being spaced apart from one another and being adjustable about the longitudinal axis of the leg means, said free ends of said arm means further being supportable against the body of a photographer, holder means fixable on the upper end part of said stand tube, said supporting arm means being mounted on said holder means and being pivotable from a position parallel to said stand tube to a position approximately at right angles thereto, whereby the pivoting planes of said arm means diverge outwardly with respect to one another from the stand, said holder means including two jaw members connected to one another by a hinge means, said jaw members enclosing a recess for said stand tube, said holder means being clampable on said stand tube by means of a connecting element for said jaw members.

2. A stand for a camera as defined in claim 1, further including bolt means rotatably mounted in said respective jaw members of said holder means, said bolt means having cross bores therethrough, said supporting arm means comprising rod means which are held in their axial direction movable in said cross bores.

3. A stand for a camera as defined in claim 2, wherein said rotatable bolt means are axially movable, spring means for said axially movable bolt means for influencing the same such that said supporting arm means are caused to laterally press against an outer face of a respective jaw member.

4. A stand for a camera as defined in claim 3, further including anchoring means provided in the faces of said jaw members for anchoring said supporting arms.

5. A stand for a camera as defined in claim 4, wherein said anchoring means comprises grooves.